United States Patent
Amrhein et al.

(10) Patent No.: US 8,519,588 B2
(45) Date of Patent: Aug. 27, 2013

(54) PERMANENT-MAGNETIC ROTOR

(75) Inventors: Wolfgang Amrhein, Ottensheim (AT); Ralf de la Haye, Bielefeld (DE); Siegfried Silber, Kirchschlag (AT)

(73) Assignee: HANNING Elektro-Werke GmbH & Co. KG, Oerlinghausen (DE)

( * ) Notice: Subject to any disclaimer, the term of this patent is extended or adjusted under 35 U.S.C. 154(b) by 233 days.

(21) Appl. No.: 12/737,432

(22) PCT Filed: Jul. 10, 2009

(86) PCT No.: PCT/EP2009/005033
§ 371 (c)(1), (2), (4) Date: Jan. 13, 2011

(87) PCT Pub. No.: WO2010/006737
PCT Pub. Date: Jan. 21, 2010

(65) Prior Publication Data
US 2011/0127859 A1    Jun. 2, 2011

(30) Foreign Application Priority Data
Jul. 14, 2008  (DE) .................... 10 2008 032 844

(51) Int. Cl.
*H02K 21/12* (2006.01)

(52) U.S. Cl.
USPC ........ 310/156.56; 310/216.059; 310/216.098; 310/216.008

(58) Field of Classification Search
USPC ......... 310/156.55–156.57, 216.007–216.008, 310/216.016, 216.048, 216.057–216.059, 310/216.064, 216.088, 216.098, 216.099
See application file for complete search history.

(56) References Cited

U.S. PATENT DOCUMENTS

| 4,469,970 | A |   | 9/1984  | Neumann |
|-----------|---|---|---------|---------|
| 5,684,352 | A |   | 11/1997 | Mita et al. |
| 5,786,650 | A |   | 7/1998  | Uchida et al. |
| 5,829,120 | A |   | 11/1998 | Uchida et al. |
| 5,886,441 | A |   | 3/1999  | Uchida et al. |
| 5,889,346 | A |   | 3/1999  | Uchida et al. |
| 5,894,182 | A | * | 4/1999  | Saban et al. ........... 310/216.048 |
| 5,939,810 | A | * | 8/1999  | Uchida et al. .......... 310/156.57 |
| 6,150,747 | A | * | 11/2000 | Smith et al. ........... 310/216.137 |

(Continued)

FOREIGN PATENT DOCUMENTS

| DE | 34 18 069  | 11/1985 |
| DE | 694 09 889 | 12/1998 |

(Continued)

OTHER PUBLICATIONS

International Search Report.

*Primary Examiner* — Dang Le
(74) *Attorney, Agent, or Firm* — Collard & Roe, P.C.

(57) ABSTRACT

A permanent magnetic rotor for an electric motor, preferably for an internal rotor motor, includes a laminated core consisting of several rotor sheets that are stacked in the axial direction. Permanent magnets are arranged in receiving pockets formed by recesses of the rotor sheets, the laminated core being composed of at least two differently shaped types of rotor sheets. Several rotor sheets of a first type of rotor sheet are provided as retaining sheets that respectively include a central yoke lamination section that is connected or can be connected to the rotor shaft and respectively one or more external pole shoe sections that are connected to the yoke lamination section by one or more connecting bars or bar sections, and several rotor sheets of a second type of rotor sheet are provided as intermediate sheets without connecting bars.

16 Claims, 7 Drawing Sheets

(56) References Cited

U.S. PATENT DOCUMENTS

| | | |
|---|---|---|
| 6,445,100 B2 * | 9/2002 | Tajima et al. ............ 310/156.57 |
| 6,919,663 B2 | 7/2005 | Iles-Klumpner |
| 2008/0296990 A1 | 12/2008 | Evans |

FOREIGN PATENT DOCUMENTS

| | | |
|---|---|---|
| DE | 199 15 664 | 10/2000 |
| DE | 20 2004 016 534 | 1/2005 |
| DE | 10 2005 047 771 | 4/2007 |
| DE | 10 2006 006 882 | 5/2007 |
| EP | 1 456 931 | 9/2004 |
| EP | 1 855 370 | 11/2007 |
| JP | 2001-037119 | 2/2001 |

* cited by examiner

PERMANENT-MAGNETIC ROTOR

CROSS REFERENCE TO RELATED APPLICATIONS

This application is the National Stage of PCT/EP2009/005033 filed on Jul. 10, 2009, which claims priority under 35 U.S.C. §119 of German Application No. 10 2008 032 844.8 filed on Jul. 14, 2008, the disclosure of which is incorporated by reference. The international application under PCT article 21(2) was not published in English.

The invention relates to a permanent-magnetic rotor for an electric motor, preferably for an internal rotor motor, which has a sheet-metal package composed of multiple rotor sheets stacked in the axial direction, whereby permanent magnets are disposed in accommodation pockets formed by recesses of the rotor sheets.

In the case of sheet-metal rotors of this type, known from practice, the magnets are generally embedded into the rotor and consequently are completely surrounded by ferromagnetic material. This is possible, in terms of design, in that the individual rotor sheets are provided with recesses that are disposed to be aligned after corresponding package formation, and form accommodation pockets for the permanent magnets. In this connection, thin short-circuit crosspieces are formed in the region of the magnets or in the region of the recess, which crosspieces are also referred to as saturation crosspieces, and short-circuit part of the permanent-magnetic flow.

Such a rotor is known, for example, from EP 1 456 931 B1. The accommodation pockets or recesses are "longer" in cross-section than the permanent magnets, in other words they are not completely filled by them, so that hollow sections occur on both sides of the magnets, which have the shape of an irregular pentagon. In the region of these hollow sections, narrow sheet-metal sections of the rotor sheets are provided, which sections form short-circuit crosspieces or saturation crosspieces, and are mainly supposed to have a mechanical supporting function. The same holds true analogously for the publication DE 20 2004 016 534 U1.

EP 1 855 370 A1 also concerns itself with the design of a rotor sheet in which the recesses for the permanent magnets have hollow sections on both sides, which sections possess a special shape, in order to influence the magnetic flow in a positive manner. In the case of the embodiment known in this regard, as well, all the rotor sheets are provided with short-circuit crosspieces.

It is a disadvantage in the design of such rotors, having magnets that are oriented tangentially, for example, that the short-circuit crosspieces or saturation crosspieces, which are primarily design-related, short-circuit part of the magnetic flow and consequently reduce the degree of effectiveness of the motor, since the permanent magnets are not being optimally utilized.

For this reason, embodiments are also known, in which there are no short-circuit crosspieces between adjacent pole-shoe sections. However, such embodiments are frequently disadvantageous in terms of stability. For this reason, U.S. Pat. No. 4,469,970 proposes a permanent-magnetic rotor that consists of a plurality of metal sheets, whereby some metal sheets are provided in which the pole-shoe sections are connected with one another by means of short-circuit crosspieces. Connecting such a sheet-metal package to the rotor shaft takes place by way of end-side end caps. Furthermore, the individual metal sheets of the sheet-metal package are provided with a plurality of bores, so that the metal sheets are coupled with one another using connecting rods. Such a structure is relatively complicated and has only limited stability.

Furthermore, a rotor for a synchronous motor is known, having a plurality of permanent magnets disposed in a radial orientation, which are disposed around a shaft and magnetized alternately in a circumference direction. The sheet-metal package of this rotor is essentially composed of sheet-metal parts in the form of segments, which are disposed between two radially oriented magnets, in each instance. Supplementally, one-piece metal sheets can be provided, in which individual sheet sections are connected with one another by way of crosspieces. This rotor, having radially oriented magnets, in a special construction, is supposed to demonstrate particularly great stability, so that it can also be used as a high-speed rotor (see DE 694 09 889 T2).

Furthermore, it is known, in designing stators, to construct these from a plurality of sheet-metal lamellae, whereby the individual sheet-metal lamellae have recesses or the like, which are supposed to accommodate the stator windings. In this connection, DE 34 18 069 A1 proposes layering a sheet-metal package from different groups of lamellae. Such developments had no influence on the design and configuration of rotors of an electric motor.

The invention is based on the task of creating a permanent-magnetic rotor for an electric motor, preferably for an internal rotor motor, of the type described initially, which rotor achieves an optimal degree of effectiveness with a simple and cost-advantageous structure, and, at the same time, is characterized by great stability.

To accomplish this task, the invention teaches a permanent-magnetic rotor for an electric motor, preferably for an internal rotor motor, which has a sheet-metal package composed of multiple rotor sheets stacked in the axial direction, whereby permanent magnets are disposed in accommodation pockets formed by recesses of the rotor sheets, characterized in that the sheet-metal package is composed of at least two rotor sheet types that have different shapes, whereby on the one hand, multiple rotor sheets of a first rotor sheet type are provided as holder sheets, which have a (central) yoke sheet section, in each instance, which section is connected or can be connected with the rotor shaft, and have one or more (outer) pole-shoe sections, in each instance, which are connected with the yoke sheet section by way of one or more connection crosspieces or crosspiece sections, and whereby on the other hand, multiple rotor sheets of a second rotor sheet type are provided as intermediate sheets, without any connection crosspieces.

and whereby on the other hand, multiple rotor sheets of a second rotor sheet type are provided as intermediate sheets, without any connection crosspieces.

In this connection, the connection crosspieces or one or more crosspiece sections of these connection crosspieces can be magnetically saturated during operation (at least part of the time), and consequently form saturation crosspieces or short-circuit crosspieces. In this connection, the invention first of all proceeds from the recognition that it is not necessary to configure all the sheets of a rotor identically, and consequently to provide all the sheets of a rotor with connection or short-circuit crosspieces, but rather that it is advantageous to work with different sheet types, whereby only part of the sheets used are equipped with short-circuit crosspieces, and in the case of another part of the sheets, there are no short-circuit crosspieces. Within the scope of the invention, different sheet types particularly means that these sheet types are formed differently and consequently have a different shape (in a top view). However, in general, the sheets of the different sheet types are manufactured from the same material and in the same thickness. However, the invention also comprises embodiments in which the sheets of the different sheet types have a different thickness and/or are manufactured from different materials.

In this connection, the rotor sheets that form the holder sheets are particularly characterized by great stability, since the central yoke sheet sections, with the outer pole-shoe sections, are connected with one another by way of the connection crosspieces. In this way, simple and reliable coupling of the individual sheets and consequently of the entire sheet-metal package to the rotor shaft is also made possible. This is because the individual sheets and, in particular, the holder sheets have central yoke sheet sections that are provided with central recesses, into which the rotor shaft can be inserted. Accordingly, connecting the rotor shaft to the sheets takes place in simple manner, for example by means of a press fit, without end-side attachment caps having to be provided. However, the invention also comprises embodiments with such end caps.

The holder sheets preferably have one or more recesses, in each instance, which are configured as holder recesses for the magnets and into which the magnets are consequently inserted. In this connection, the magnets are preferably oriented (geometrically) in the tangential direction, in other words, in a possible embodiment, they run orthogonal or essentially orthogonal to the radius of the rotor, in cross-section. However, the magnets can also be disposed at a slant, at a predetermined angle to the radius of the rotor, whereby the individual magnets can also be disposed at different angles to the radius, in the case of a multi-pole rotor. In any case, embodiments in which the magnetization direction of the magnets runs radially or approximately radially, or diametrically or also at a slant, are covered. In total, the magnetization direction runs from the inside to the outside, or, vice versa, from the outside to the inside, on the whole. Fundamentally, however, the invention also covers embodiments in which the magnets are oriented (geometrically) radially, and the magnetization direction therefore runs approximately tangentially.

According to a first embodiment of the invention, it is proposed that one or more rotor sheets of the second type, in other words intermediate sheets, are disposed between two axially spaced-apart rotor sheets of the first type, in other words holder sheets. In this connection, it can be practical to dispose three or even more rotor sheets of the second type between two axially spaced-apart rotor sheets of the first type. In this connection, the holding function of the rotor sheets for the magnets is essentially or exclusively taken on by the rotor sheets of the first type, since these preferably have closed recesses as holders for the permanent magnets, which are oriented tangentially, for example. In this connection, the invention has recognized that it is sufficient if this holder function is not taken on by all the rotor sheets, but merely by part of the rotor sheets, for example by every third, every fourth . . . (or every nth) rotor sheet. In this manner, the number of connection crosspieces that are present, which act as short-circuit crosspieces (in certain regions or certain sections), is significantly reduced, so that in this way, the short-circuit flow is also significantly reduced, and consequently, utilization of the permanent magnets is improved. In this way, a better degree of effectiveness can be achieved, overall, without the stability of the rotor suffering because of it.

Within the scope of the invention, rotor sheet or rotor sheet type always means a rotor sheet disposed in an axial plane. In the embodiment described, either rotor sheets having a connection or short-circuit crosspiece or rotor sheets without any connection or short-circuit crosspiece are consequently disposed in a plane, whereby preferably, significantly more rotor sheets without short-circuit crosspieces are used, preferably at least twice as many, particularly preferably at least three times as many. In the case of these embodiments, in particular, it can be practical if the rotor sheets of the first sheet type (holder sheets) are manufactured in one piece or as one part, and consequently have recesses for all the permanent magnets, while the rotor sheets of the second sheet type (intermediate sheets), without the short-circuit crosspieces and without accommodation pockets or the like, are preferably configured in multiple parts. These multi-part intermediate sheets are then held or fixed in place between the rotor sheets of the first sheet type, which form holder sheets for the magnets and particularly also for the other sheets, during the course of assembly.

According to another proposal having independent significance, however, the invention also comprises embodiments in which the sheet-metal package has at least rotor sheets of a first rotor sheet type, which are configured in multiple parts, in each instance, and have at least one (separate) first sheet part as a holder sheet part having one or more recesses, which part has a (central) yoke sheet section that is connected or can be connected with a rotor shaft, and one or more outer pole-shoe sections that are connected with the yoke sheet section by way of one or more connection crosspieces or crosspiece sections, and on the other hand has at least one second sheet part without any connection crosspieces (and without any recesses). In this embodiment, a rotor sheet disposed in an axial plane consequently does not form a holder sheet for all the permanent magnets, but rather merely a holder sheet or holder sheet part for part of the permanent magnets, or, if applicable, even for only one permanent magnet. In this embodiment, it is then practical if two sheets of this (first) multi-part sheet type, disposed one behind the other in the axial direction (spaced apart, if necessary), are disposed offset relative to one another by a predetermined angle. In the case of this embodiment, as well, it can be practical to provide one or more rotor sheets of the second sheet type, without any connection or short-circuit crosspieces, between the individual sheets of the first sheet type, which are disposed one after the other, rotated by a predetermined angle relative to one another. However, the invention also comprises embodiments in which the sheet-metal package is exclusively composed of rotor sheets of this multi-part (first) sheet type, whereby then, it is of particular importance that these sheets consist of at least one holder sheet having connection or short-circuit crosspieces, on the one hand, and of at least one sheet part separate from this, without any connection or short-circuit crosspieces. The (geometric) angle by which the individual rotor sheets of this first sheet type are disposed rotated relative to one another depends on the number of poles of the rotor. In the case of a four-pole rotor, it can be practical to rotate the rotor sheets by 90°, in each instance. In the case of a six-pole rotor, an angle of 60° is recommended, etc. Also, a multiple of these angles can be selected, in each instance. In the case of this embodiment, having a single sheet type, the fact that it is possible to work with a single punching tool during the course of production, since all the rotor sheets are configured identically and are merely installed rotated at a specific angle relative to one another, during the course of assembly, is particularly advantageous. Nevertheless, the advantages described initially are achieved.

The rotor sheets of the first sheet type or the first sheet parts of the rotor sheets of the first sheet type are preferably configured as holder sheets for the magnets, having one or more recesses for the magnets, in each instance, within the scope of the invention, as has been explained above. In this connection, the (closed) recesses are delimited, at least in certain regions, by connection and/or short-circuit crosspieces. These rotor sheets or rotor sheet parts, which are configured as holder sheets, preferably have a central section that is connected or can be connected with a rotor shaft. Furthermore, the rotor sheets or rotor sheet parts, which are configured as holder sheets, have one or more outer pole-shoe sections or pole-shoe sections on the outer circumference side, in each instance. In this connection, the pole-shoe section(s) is/are connected with the central yoke sheet section by way of one or more connection crosspieces. Furthermore, two adjacent pole-shoe sections, in each instance, can be connected with one another by way of at least one connection or short-circuit crosspiece. These holder sheets, which have the recesses for the magnets and consequently also the short-circuit crosspieces, consequently essentially take on the support function of the sheet-metal package.

In contrast, the rotor sheets of the second sheet type are configured as intermediate sheets, which are preferably fixed in place between two axially spaced-apart holder sheets. These intermediate sheets of the second sheet type, which are consequently configured entirely without any connection and short-circuit crosspieces, can preferably be configured in multiple parts and consist of multiple separate sheet parts. These separate sheet parts can form pole-shoe sheets, among other things. In this connection, it is practical if these multi-part rotor sheets of the second sheet type have at least one central yoke sheet part, which can be set or is set onto a rotor shaft as a yoke, and furthermore has one or more pole-shoe sheet parts on the outer circumference side, which is disposed on the outside of the magnet, without any connection to the central yoke sheet part. These pole-shoe sheet parts on the outer circumference side consequently form the pole shoes of the assembled rotor, whereby these pole-shoe sheet parts then preferably align with the corresponding pole-shoe sections of the holder sheets. The magnets are disposed between the central yoke sheet part and the outer pole-shoe sheet part in the region of these intermediate sheets, whereby, however, these sheet parts are held by adjacent sheet parts and, in particular, also by adjacent holder sheet parts, with which they are connected. A yoke (or yoke sheet part or yoke sheet section), which particularly serves for coupling the sheets to the shaft, is therefore a ferromagnetic part that (magnetically) connects at least two different magnetic poles with one another, whereby a pole can also be composed of poles having the same name. Consequently, multiple magnets can be disposed in a pocket or recess. Furthermore, not all the pockets have to be filled.

The connection crosspieces disposed on the rotor sheets of the first rotor type can be configured to be essentially T-shaped or also L-shaped, for example, and can have a radially oriented first crosspiece section as well as a tangentially oriented second crosspiece section, which is consequently oriented approximately orthogonal to the first crosspiece section. A T-shaped configuration of the connection crosspieces is particularly suitable for the holder sheets, whereby such a T-shaped connection crosspiece then connects two adjacent pole-shoe sections with its first tangential crosspiece section. The second crosspiece section, which is disposed orthogonal to the first, then connects the tangential first crosspiece section with the central yoke sheet section. In the case of such an embodiment, the tangential first crosspiece section forms a short-circuit crosspiece or saturation crosspiece, since it (always) connects regions having different magnetic potential with one another, and is consequently (permanently) magnetically saturated. In contrast, the radially oriented crosspiece section essentially forms (merely) a connection crosspiece in the case of such a T-shaped embodiment, which crosspiece is free of flow during operation in specific angle positions. However, the invention also comprises embodiments in which the holder sheets are not equipped with T-shaped connection crosspieces and in which there are no tangentially oriented short-circuit sections at all. For example, the possibility exists that the central yoke sheet section is connected with the yoke sheet section not indirectly, by way of connection crosspieces, but rather directly, by way of one or more (simple) connection crosspieces. Thus, in an alternative embodiment, the invention proposes that the connection crosspieces are configured as simple, straight or essentially straight crosspieces, which (directly) connect a yoke sheet section and a pole-shoe section with one another. Such crosspieces essentially have an I shape. These straight crosspieces can also be disposed tangentially or essentially tangentially, but preferably at a predetermined angle at a slant to the radius, and can connect the corner regions of a yoke sheet section with the corner regions or edge regions of a pole-shoe sheet section, for example. In the case of this embodiment, the possibility then exists that the adjacent (straight) crosspieces assigned to two adjacent pole-shoe sheet sections are disposed in V shape, at a predetermined angle relative to one another, which angle can be smaller than 90°, but also greater than or equal to 90°.

An L-shaped connection crosspiece is particularly suitable in embodiments having a holder sheet part, which merely has recesses for part of the magnets. Then it can be practical to connect a pole-shoe section of such a holder sheet with the central yoke sheet section by way of an L-shaped connection crosspiece or two L-shaped connection crosspieces, whereby such an L-shaped connection crosspiece then has a first crosspiece section that runs tangentially and a second crosspiece section that is disposed orthogonal to it and runs essentially radially. In this embodiment, the two crosspiece sections and consequently the entire connection crosspiece form a short-circuit crosspiece or saturation crosspiece. In these embodiments, in which a holder sheet part is provided for accommodating only part of the magnets, in each instance, it is also possible to work with simple or straight crosspieces, which directly connect the yoke sheet section with the pole-shoe section. In these embodiments, as well, these straight or simple crosspieces are then disposed approximately radially or preferably at a predetermined angle relative to the radius.

Optionally, the invention proposes that the intermediate sheets or parts of the intermediate sheets, for example the yoke sheet parts, have one or more installation projections that are supposed to simplify or optimize the handling of the intermediate sheets and, in particular, of the yoke sheet parts, during the course of assembly. These installation projections are preferably formed onto the intermediate sheets on the outer circumference side, for example onto the yoke sheet parts on the outer circumference side, and are oriented radially outward, for example. This is because during the course of production or assembly of a rotor package from individual rotor sheets, it must be avoided, particularly in the case of the intermediate sheets, that the yoke sheet parts that are not connected with the outer pole-shoe sheet parts rotate relative to the pole-shoe sheet parts. An installation projection formed on the outer circumference side, which is fundamentally not necessary from a magnetic point of view, simplifies handling. Fundamentally, it is sufficient to provide only one installation projection. For reasons of symmetry, however, it is practical, in terms of production technology, to provide a plurality of installation projections, which are symmetrically distributed over the circumference of the yoke sheet parts. Particularly preferably, the installation projections are formed onto the yoke sheet parts in such a manner that they are disposed between two adjacent pole-shoe sheet sections and preferably align with a connection crosspiece or a section of a connection crosspiece in the assembled state. In general, yoke sheet parts of the intermediate sheets are configured to be polygonal, and preferably have the shape of a regular polygon. In this case, the holder projections are preferably disposed at the corners of this polygon. In the case of a six-pole rotor having six magnets, for example, the yoke sheet parts of the intermediate sheets are configured to be hexagonal, for example, so that six installation projections, for example, are disposed at the six corners of the hexagon. The same holds true analogously for a four-pole rotor having rectangular yoke sheet parts or also an eight-pole magnet having octagonal yoke sheet parts.

The pole shoes or pole-shoe sections can have a width that approximately corresponds to the width of the magnets (viewed in cross-section) or is less. This leads to optimization of the field, particularly with regard to the most sine-shaped progression possible. However, the invention also comprises embodiments in which the pole shoes or pole-shoe sections are wider than the magnets, in other words the magnets are narrower than the pole shoes or pole-shoe sections. This leads to a saving in material for the magnets.

The magnetic flow concentration can be achieved by means of corresponding shaping of the individual pole-shoe sheets or pole-shoe sections. These allow influencing the longitudinal and transverse inductances and thus optimization, for example with regard to sensor-free operation at very small speeds of rotation or at a speed of rotation of zero. In this connection, it can be practical to provide a "variable" and consequently not constant air gap over the circumference of the rotor. This can be utilized to minimize the engagement moments and to optimize the torque.

According to another proposal, it is provided that the recesses in the sheets are larger than the cross-sectional area of the magnets, so that when magnets are inserted into the recesses, cavities are formed on one side or on both sides of the magnets. These cavities also allow influencing the flow density, by means of their shaping, so that the engagement moment can be predetermined in targeted manner. The shape of the connection crosspieces or short-circuit crosspieces and of the cavities can be selected in such a manner that the crosspieces saturate magnetically.

It has already been explained that the pole-shoe sections and/or pole-shoe sheet parts can have a width that approximately corresponds to the width of the magnets or is greater than the width of the magnets. In the case of such an embodiment, in particular, the invention proposes, in a preferred further development, that holder crosspieces are formed onto the pole-shoe sections and/or the pole-shoe sheet parts, which crosspieces engage around the magnets in the assembled state. Secure fixation of the magnets within the recesses is guaranteed using these holder crosspieces, which are preferably disposed on both sides of the magnets. Nevertheless, the cavities described above can be formed on both sides of the magnets.

During the course of production, the individual rotor sheets are connected with one another in the axial direction, by means of adhesion, material fit, shape fit and/or force fit. Production can take place by way of punched package formation. Consequently, the connection can be achieved by means of punch nubs and/or by means of gluing or, alternatively or supplementally, also by means of injection-molding around the package. Weld connections are also not excluded. In any case, it is guaranteed, within the scope of the invention, that the supporting function is first of all taken on essentially by the rotor sheets of the first sheet type (holder sheets), which have connection and/or short-circuit crosspieces and consequently also preferably recesses for the permanent magnets. These rotor sheets of the first sheet type are consequently configured as holder sheets for the permanent magnets and the other sheets (at least in certain regions or at least in part). The rotor sheets of the second sheet type, or also parts of the rotor sheets of the first sheet type, which do not have any connection crosspieces, can be fixed in place between the rotor sheets of the first sheet type, as intermediate sheets, in the axial direction. The sheets or sheet parts structured with connection or short-circuit crosspieces are consequently used for attaching the (multi-part) sheets or sheet parts, which do not have any crosspieces and essentially form the pole shoes. The mechanical strength is particularly achieved by means of the holder sheets or holder sheet parts, whereby it is of particular importance that the central yoke sheet sections are directly or indirectly connected with the outer pole-shoe sections, in order to increase the stability, particularly against centripetal forces, by way of connection crosspieces or crosspiece sections that are oriented radially, for example.

In a modified embodiment of the invention, having magnets oriented essentially radially or at a slant with reference to the radius of the rotor, in which the rotor sheets have multiple pole-shoe sections disposed between the magnets, and in which two adjacent pole-shoe sections, in each instance, are connected with one another by way of at least one connection crosspiece, the invention proposes that the sheet-metal package is composed of at least two rotor sheet types having different shapes, whereby on the one hand, the rotor has one or more rotor sheets of a first sheet type, in which two adjacent pole-shoe sections are connected by way of connection crosspieces on the outer circumference side, which crosspieces delimit the recess for the permanent magnets on the outside, and that on the other hand, the rotor has one or more rotor sheets of a second sheet type, in which two adjacent pole-shoe sections are connected by way of connection crosspieces on the inner circumference side, which crosspieces delimit the recess for the permanent magnets on the inside. In this manner, as well, the number of connection crosspieces and consequently of saturation crosspieces or short-circuit crosspieces is reduced, so that a high degree of effectiveness of the motor is achieved. Nevertheless, the rotor sheet package is characterized by great stability, since the individual rotor sheets have connection crosspieces either on the outside or on the inside, so that a stable embodiment with accommodation pockets for the permanent magnets is formed by means of suitable stacking of these different sheet types. In this connection, the connection crosspieces on the outside and/or the connection crosspieces on the inside run in an essentially tangential direction. In this connection, the connection crosspieces of a rotor sheet on the inside (jointly) form a ring that surrounds the rotor shaft. In this manner, attachment of the shaft to the sheet-metal package is furthermore simplified. In the case of this embodiment, as well, production preferably takes place by way of punched package formation.

In order to increase the stability, it can be practical, in the case of the different embodiments of the invention as described, to encase the sheet-metal package by means of injection-molding, for example with synthetic resin or plastic. This particularly leads to an increase in strength. The end caps provided in the state of the art can be eliminated.

The rotor shaft can be structured to be ferromagnetic, in known manner. In this way, the rotor yoke can be supported during magnetic flow.

The invention also relates to an electric motor having at least one stator and at least one rotor of the type described. The rotor described is consequently protected not just independently, but also particularly in combination with a suitable stator. In this connection, it is of particular significance that the rotor according to the invention can be combined with the most varied stator types. The rotor according to the invention is particularly well suited for stators using the fractional-slot winding technique.

The rotor can accommodate four to ten magnets, for example, and consequently can be configured to have four poles to ten poles, for example four poles, six poles, or eight poles. However, embodiments having a different number of poles are also covered.

In the following, the invention will be explained in greater detail using drawings that represent embodiments merely as examples. The figures show:

FIG. 1 a sheet-metal package for a permanent-magnetic rotor according to the invention, in a first embodiment, in a perspective representation, FIG. 2 a rotor sheet of the first sheet type of the rotor according to FIG. 1, FIG. 3 a rotor sheet of the second sheet type of the rotor according to FIG. 1, FIG. 4 a sheet-metal package in a modified embodiment, in a perspective representation, FIG. 5 a rotor sheet of the first sheet type of the rotor according to FIG. 4, FIG. 6 a rotor sheet of the second sheet type of the rotor according to FIG. 4, FIG. 7 a simplified cross-section through an electric motor having a rotor with a sheet-metal package according to FIG. 4, FIG. 8 a rotor sheet of the first sheet type (according to FIG. 2) in a modified embodiment, and FIG. 9 a rotor sheet of the first sheet type (according to FIG. 5) in another embodiment, FIG. 10 a rotor sheet of a first sheet type for a rotor in another embodiment, FIG. 11 a rotor sheet of a second sheet type for a rotor corresponding to FIG. 10, FIG. 12 a sheet-metal package in a modified embodiment, in a perspective representation, FIG. 13 a rotor sheet of the first sheet type of the sheet-metal package according to FIG. 12, and FIG. 14 a rotor sheet of the second sheet type of the sheet-metal package according to FIG. 12.

In the figures, a permanent-magnetic rotor 2 for an electric motor in the embodiment as an internal rotor motor is shown (in a detail, in each instance). Such a rotor 2 has a sheet-metal package 3 composed of multiple rotor sheets 4, 4', 5 stacked in the axial direction. Some of the rotor sheets or all the rotor sheets have recesses 6. The rotor sheets are packaged or stacked to form the sheet-metal package 3, so that the recesses 6, in their entirety, then form accommodation pockets 7 for permanent magnets 8, which are inserted or have been inserted into the accommodation pockets 7.

Figures 1, 2:
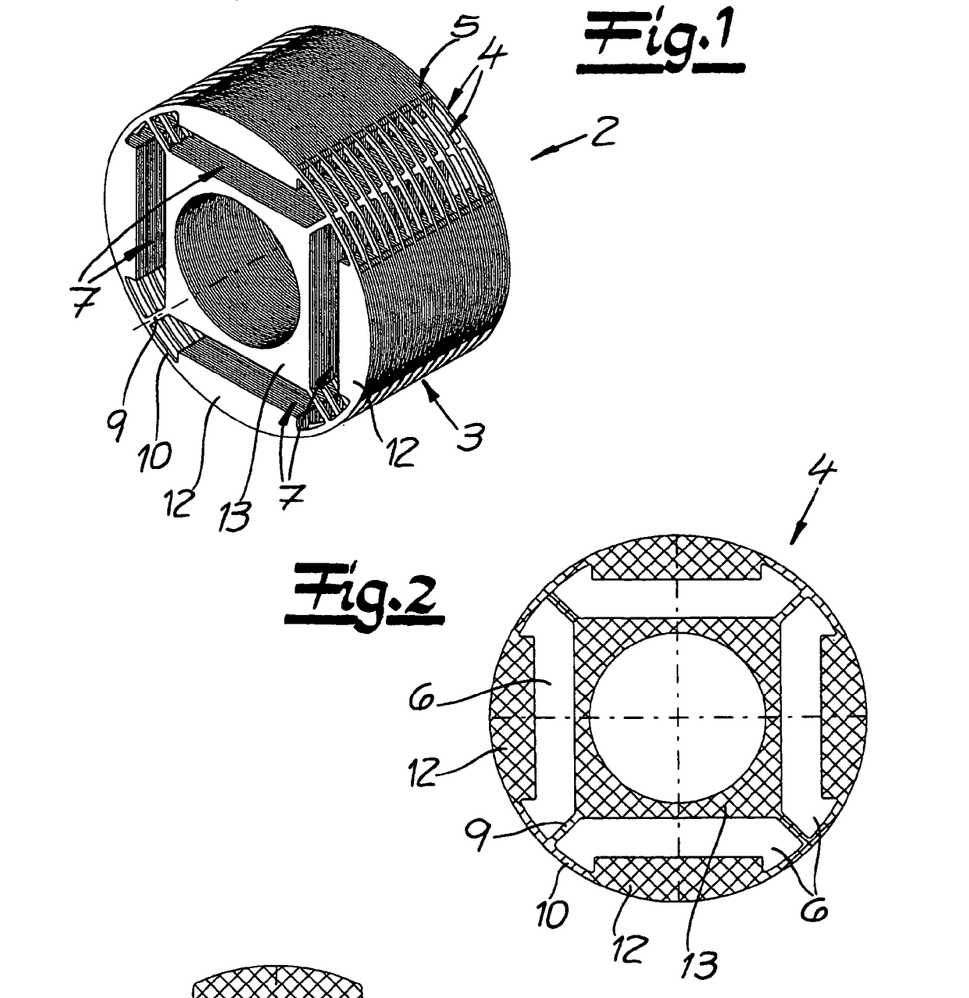

In the embodiments according to FIGS. 1 to 11, the magnets are oriented (in cross-section) essentially (geometrically) in the tangential direction, in other words they run orthogonal or essentially orthogonal to the radius in the cross-sectional representation shown in FIG. 2, for example. While FIGS. 1 to 6 merely show the sheet-metal packages 3 or parts of the sheet-metal packages 3 without magnets, FIG. 7, in a simplified representation, indicates the structure of a motor having such a rotor 2 with sheet-metal package 3 and magnets 8, as an example.

In the exemplary embodiments according to FIGS. 1 to 11, the sheet-metal package 3 consists of at least two rotor sheet types that are shaped in different ways. On the one hand, multiple rotor sheets 4 of 4' of a first rotor sheet type are used, in which one or more connection crosspieces 9, 9', 10 are disposed in the region of a magnet 8 and/or between two adjacent magnets 8. On the other hand, multiple rotor sheets 5 of a second rotor sheet type, without any such connection crosspieces, are used. In this manner, within the scope of the invention, the number of connection crosspieces or short-circuit crosspieces used is supposed to be reduced, in total. In this way, the short-circuit flow is also reduced, so that the permanent magnets 8 are better utilized, and consequently, a higher degree of effectiveness is achieved.

Figure 3:
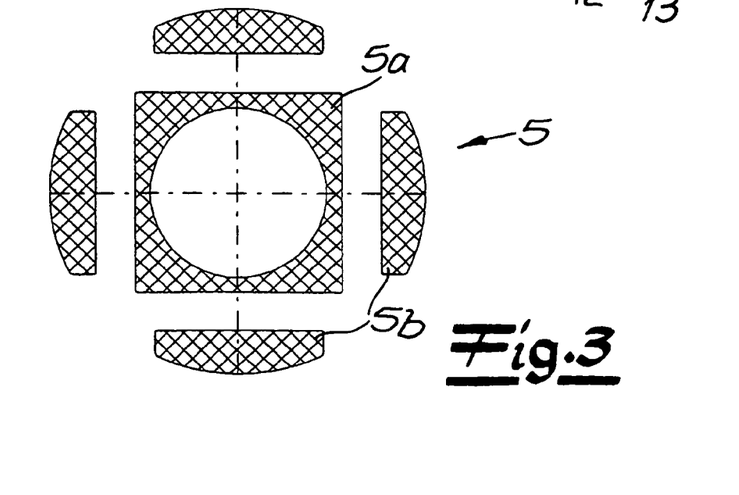

This will first be explained, as an example, using a first exemplary embodiment according to FIGS. 1 to 3. A comparison of FIGS. 1 to 3 shows that the sheet-metal package 3 is composed of two sheet types having different shapes. On the one hand, rotor sheets 4 (according to FIG. 2), and on the other hand, rotor sheets 5 (according to FIG. 3) are used. The rotor sheets 4 have the recesses 6 for the magnets 8, which are to be inserted and are not shown in the figures. In this exemplary embodiment, these rotor sheets 4 consequently take on the function of holder sheets 4. In this exemplary embodiment, they are manufactured in one piece. In this connection, they consist of a central yoke sheet section 13 that is connected with the rotor shaft (not shown) as a yoke, and the pole-shoe sections 12, which form the magnetic pole shoes. Furthermore, the connection crosspieces 9, 10 can be seen, which connect the pole-shoe sections 12 with one another, on the one hand, as well as with the central yoke sheet section 13, on the other hand, forming the recesses 6. FIG. 1 makes it clear that multiple and at least three rotor sheets 5 of the second sheet type are disposed between two axially spaced-apart rotor sheets 4 of the first rotor type (and consequently holder sheets), forming intermediate sheets. In this connection, FIG. 3 makes it clear that these intermediate sheets 5 are configured in multiple parts and consist of multiple separate sheet parts 5a, 5b. In this connection, each intermediate sheet 5 has a central yoke sheet part 5a, which is connected with the rotor shaft, not shown, as a yoke. This central yoke sheet part 5a consequently aligns with the central yoke sheet section 13 of the holder sheet 4 after assembly has taken place. Furthermore, the intermediate sheets 5 have multiple pole-shoe sheet parts 5b on the outer circumference side, which parts are disposed without any connection with the central sheet part 5a, on the outside of the magnet, not shown. These sheet parts 5b consequently also form pole shoes or pole-shoe sheets 5b. Consequently, these pole-shoe sheet parts 5b align with the pole-shoe sections 12 of the holder sheets 4 after assembly has taken place. This is evident from a comparison of FIGS. 1 to 3. After corresponding package formation according to FIG. 1, the magnets can then be inserted. Furthermore, it is evident that the connection crosspieces 9, 10 in the exemplary embodiment according to FIGS. 1 to 3 are essentially configured in T shape, and have a radially oriented first crosspiece section 9 as well as a tangentially oriented second crosspiece section 10. The tangential first crosspiece section 10 connects two adjacent pole-shoe sections 12 with one another. In this connection, it acts as a short-circuit crosspiece. Furthermore, the pole-shoe sections 12 are connected, on the one hand, with the central section 13 by way of the tangential first crosspiece section 10 and the radial second crosspiece section 9, so that the sheets 4 as a whole can take on the supporting function that has been described, and consequently are configured as holder sheets. In contrast, the "loose" sheet parts 5a and 5b of the sheets 5 are fixed in place between the holder sheets 4.

Consequently, it becomes clear that in the sheet-metal package according to the invention, the number of short-circuit crosspieces is clearly reduced. Nevertheless, the invention is characterized by a simple and cost-advantageous as well as stable structure. This is because great stability, particularly with regard to centripetal forces, is particularly achieved by means of the connection of the central yoke sheet sections 13 with the outer pole-shoe sections 12, by way of the connection crosspieces 9, 10, and, in particular, the radially oriented crosspiece sections 9.

Figures 4, 5:
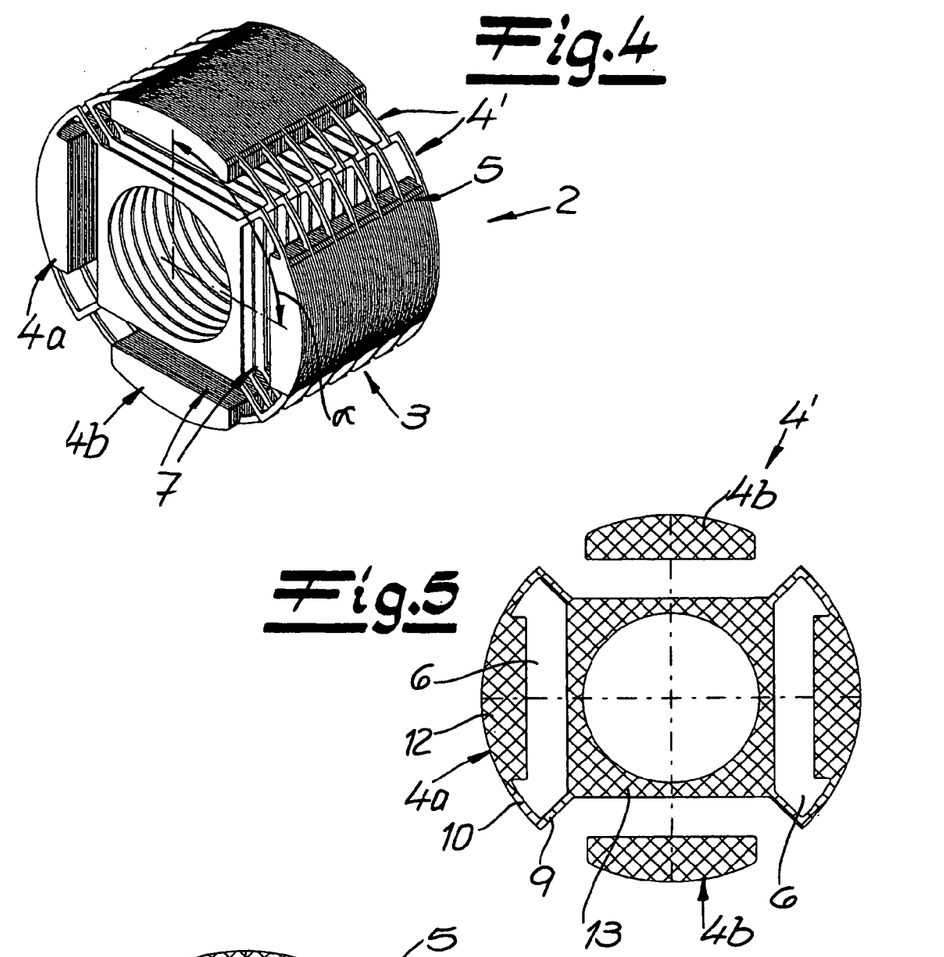
Figure 6:
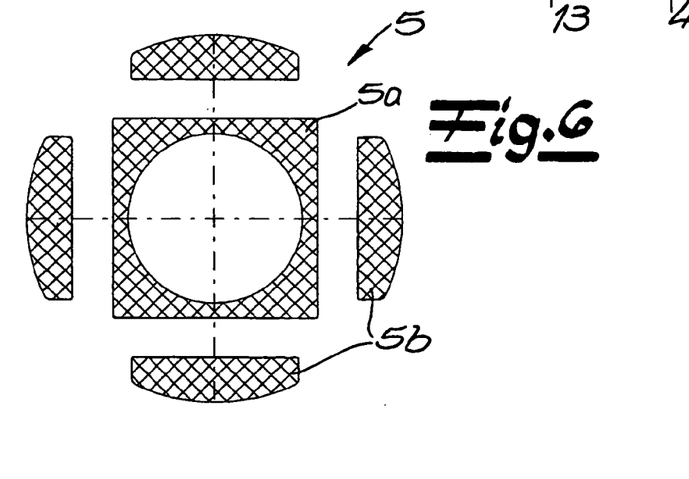

This also holds true for the second embodiment according to FIGS. 4 to 6, in which the magnets are also oriented geometrically in the tangential direction. In the case of this embodiment, as well, sheets 4' of a first sheet type are used, on the one hand, which sheets have connection crosspieces 9, 10, and on the other hand, sheets 5 of a second sheet type, without any connection crosspieces, are used. In contrast to the embodiment according to FIGS. 1 to 3, in the case of this embodiment, however, the sheets 4' of the first sheet type are not configured in one piece, and consequently they do not have holder recesses or accommodation pockets for all the magnets. Instead, FIG. 5 makes it clear that the rotor sheets 4' of the first sheet type, in this embodiment, are also configured in multiple parts, and have a first sheet part 4a as a holder sheet part, which is equipped with connection crosspieces 9, 10 and consequently also with recesses 6 for the magnets, and multiple second sheet parts 4b that are configured without any short-circuit crosspieces. In this embodiment, the connection crosspieces 9, 10 are configured essentially in L shape. They also have a radial crosspiece section 9 and a tangential crosspiece section 10, whereby in this embodiment, the entire connection crosspiece, with the two crosspiece sections 9 and 10, is magnetically saturated and consequently forms a short-circuit crosspiece. A comparison of FIGS. 4 to 6 makes it clear that in this embodiment, two rotor sheets 4' of the first sheet type, disposed one behind the other in the axial direction, in each instance, are disposed offset or rotated by a predetermined angle α relative to one another. In the exemplary embodiment, this geometric angle α amounts to 90°. This is a four-pole rotor 2. The sheet parts 4a of the sheets 4' therefore form holder sheets with recesses 6, but for only part of the magnets, in this exemplary embodiment, as well. Fixation of all the magnets is then implemented by means of the "rotated" arrangement (see FIG. 4). In this connection, the rotor sheets 4' again have a central section 13 for attachment of the shaft, as well as two pole-shoe sections 12, which are connected with the central section 13 by way of the short-circuit crosspieces 9, 10. Supplementally, the sheet parts 4b of the sheets 4' shown in FIG. 5 are then provided, which parts are not connected with the sheet part 4a. In this connection, FIG. 4 shows that the intermediate sheets 5, in other words the sheet parts 5a and 5b, as well as the sheet parts 4b are held between the sheet parts 4a of the sheets 4'. A comparison of FIGS. 5 and 6 makes it clear that in the case of such an embodiment, the possibility exists of producing both the sheet 4' and the sheet 5 using a single punching tool. First of all, the sheet according to FIG. 5 can be punched using the punching tool, in a single punching process. If sheets according to FIG. 6 are furthermore supposed to be punched, then at first a first punching process (corresponding to FIG. 5) can be carried out, and subsequently, the sheet or the punching tool can be rotated by 90°, for example, and another punching process can be carried out with the same punching tool, so that then the configuration according to FIG. 6 is formed.

FIGS. 4 to 6 furthermore make it clear that within the scope of another embodiment, not explicitly shown, the possibility also exists of composing a sheet-metal package 3 exclusively from sheets 4' of the sheet type shown in FIG. 5. Then, two adjacent sheets 4', in each instance, are disposed rotated by 90°, for example, relative to one another, so that the sheet-metal package, in contrast to the embodiments shown, is not composed of sheets of different sheet types, but rather of sheets of a single sheet type, whereby these sheets 4', however, are configured in multiple parts, in accordance with FIG. 5, and have sheet parts 4a with short-circuit crosspieces, on the one hand, and sheet parts 4b without short-circuit crosspieces, on the other hand. This can be implemented not just in the case of four-pole rotors, but also in the case of rotors having more than four poles, whereby then, the adjacent sheets 4' are disposed rotated relative to one another by a correspondingly suitable angle. In the case of this embodiment, as well, the possibility exists of producing the sheets according to FIG. 5 with a single punching process and consequently a single punching tool.

Figure 8:
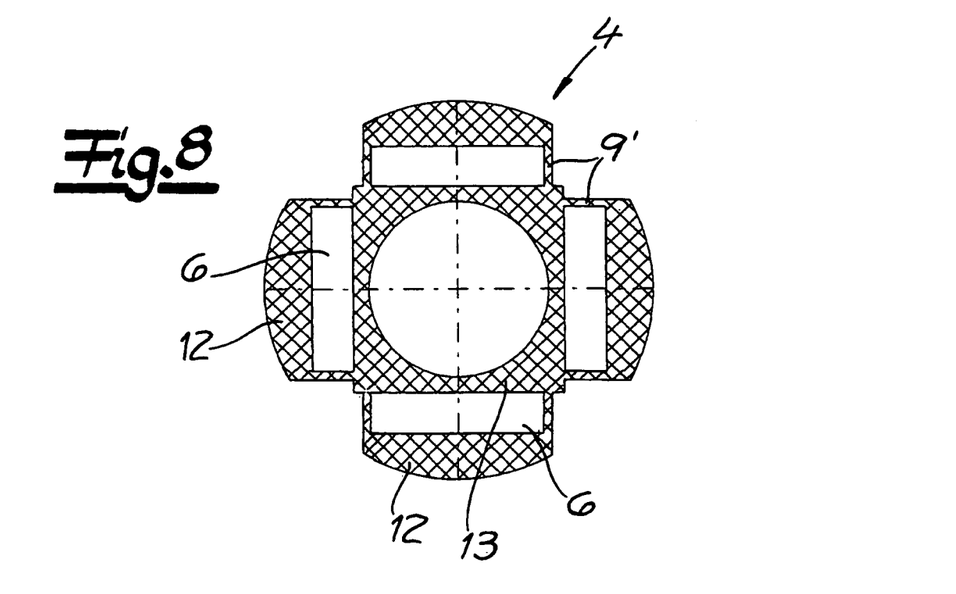
Figure 9:
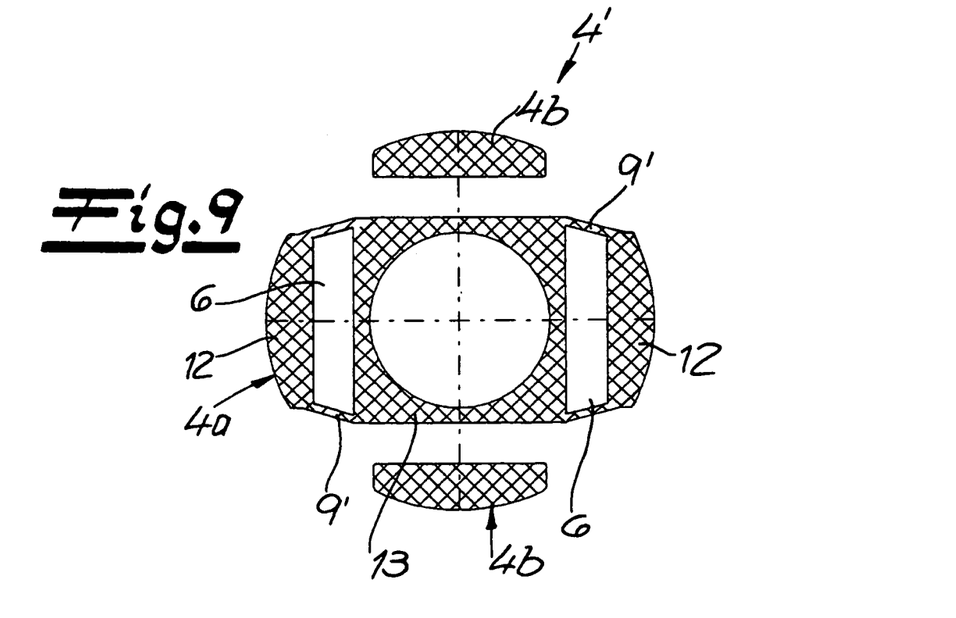

While FIGS. 1 to 6 show embodiments in which T-shaped or L-shaped connection crosspieces 9, 10 are provided, FIGS. 8 and 9 show modified embodiments, as examples, having simple and consequently straight or essentially straight crosspieces 9', which directly connect a yoke sheet section 13 with a pole-shoe section 12. In this connection, FIG. 8 shows a rotor sheet 4 of the first sheet type, and consequently a holder sheet 4, which corresponds to the sheet according to FIG. 2 in its basic structure. In this embodiment, however, there are no tangentially oriented short-circuit crosspieces that connect two adjacent pole-shoe sheet sections 12 with one another. Instead, simple connection crosspieces 9' are provided, whereby a pole-shoe sheet section 12 is directly connected with the yoke sheet section 13, in each instance, by way of two connection crosspieces 9'. In this connection, FIG. 8 makes it clear that two adjacent connection crosspieces 9' that are assigned to two adjacent pole-shoe sections 12 are disposed in V shape relative to one another, at a predetermined angle. This angle depends on the concrete design and particularly also on the number of poles of the rotor. Fundamentally, in the case of this embodiment, as well, the possibility exists of additionally providing a tangential crosspiece that directly connects two adjacent pole-shoe sheet sections 12 with one another, so that here, in total, a triangular connection crosspiece design would be provided. Such a configuration is not shown in the figures.

FIG. 9 furthermore shows that even in the case of a holder sheet part 4' that merely accommodates part of the magnets, it is possible to work with simple or straight connection crosspieces 9'. In this embodiment, a pole-shoe section 12 is connected with the yoke sheet section 13 by way of two connection crosspieces 9', in each instance. FIGS. 8 and 9 make it clear that in the case of these embodiments, the connection crosspieces connect the corner regions of a yoke sheet section 13 with the corner regions or edge regions of a pole-shoe sheet section 12, for example. In this connection, the connection crosspieces can be disposed (precisely) in the corners of the yoke sheet sections 13 (see FIG. 9) or also slightly offset or spaced apart from the corners (see FIG. 8). In this connection, the precise design according to FIG. 9 can be transferred to the embodiment according to FIG. 8, and vice versa. The precise progression of the connection crosspieces 9' furthermore depends particularly on the number of poles of the rotor, since this also influences or determines the geometric shape of the yoke sheet section 13. Furthermore, the arrangement of the connection crosspieces 9' depends on the width of the pole-shoe sections 12 with reference to the width of the yoke sheet section 13 or the width of the magnets. For example, it is indicated in FIGS. 8 and 9 that in these embodiments, the pole-shoe sections 12, in terms of their width, approximately correspond to the width of the magnets.

Figure 7:
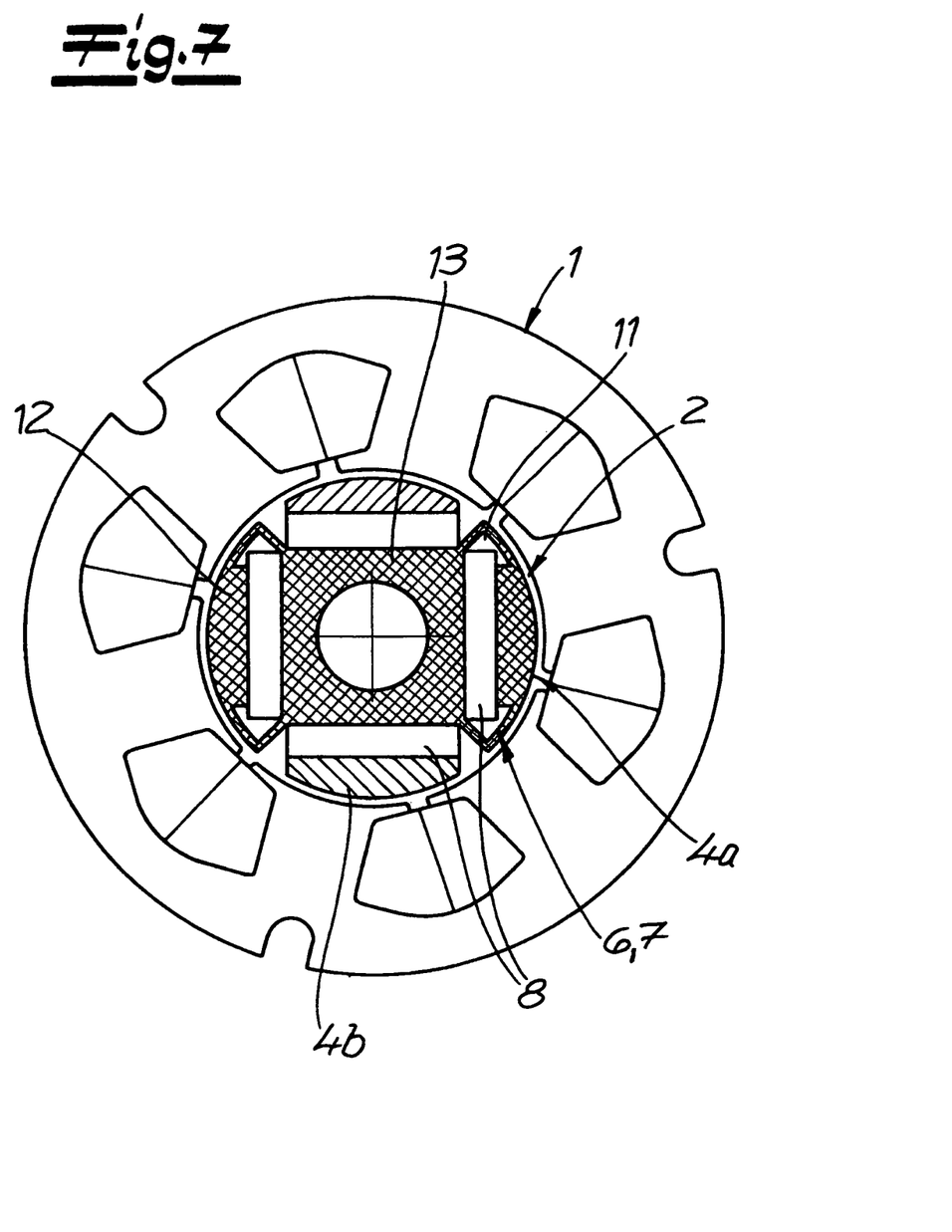

FIG. 7 illustrates the structure of an electric motor consisting of a stator 1 and a rotor 2 inserted into and rotating in it, of the type described. In this connection, FIG. 7 shows the rotor according to the embodiment according to FIGS. 4 to 6. It can be seen that the recesses 6 have a greater cross-section or a greater cross-sectional area than the inserted magnets 8, so that cavities 11 are formed on both sides of the recesses.

Furthermore, it can be seen that the pole-shoe sections 12 and/or the pole-shoe sheets or pole-shoe sheet parts 5b or 4b, respectively, are disposed on the outer circumference side in the assembled state of the sheet-metal package. Consequently, they are disposed on an outside of a magnet 8 oriented in the tangential direction, in each instance, whereby here, outside means the side of the magnet 8 that faces away from the shaft and consequently faces the stator. Consequently, a pole-shoe sheet or pole-shoe sheet part or pole-shoe section is generally directly assigned to each magnet.

Figure 10:
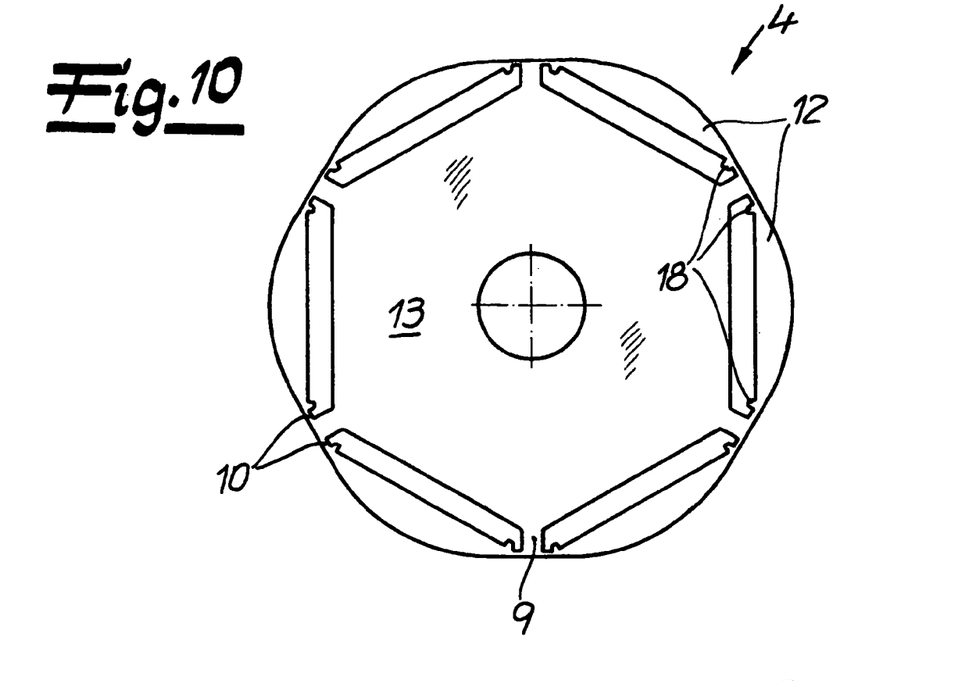
Figure 11:
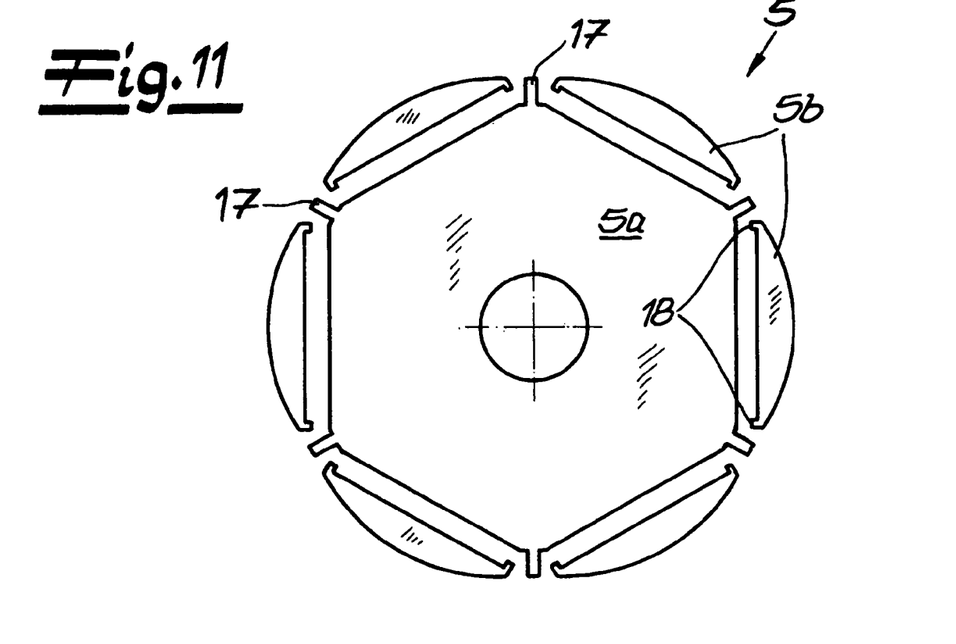

FIGS. 10 and 11 show a modified embodiment of the invention, which is comparable, in its fundamental structure, with the embodiments described and, in particular, with the embodiment according to FIGS. 1 to 3. While the embodiment according to FIGS. 1 to 3 is configured with four poles, FIGS. 10 and 11 show a six-pole variant. The rotor sheet package is composed of the holder sheets 4 according to FIG. 10, on the one hand, and the intermediate sheets 5 according to FIG. 11, on the other hand. In FIG. 10, again, the central yoke sheet section 13 and the pole-shoe sections 12 can be seen, which are connected with one another by way of connection crosspieces 9, 10. In FIG. 11, again, the separate sheet parts 5a, 5b can be seen, namely the central yoke sheet part 5a, on the one hand, as well as the pole-shoe sheet parts 5b, on the other hand. In this modified embodiment, multiple installation projections 17 are now provided, which are formed onto the yoke sheet parts 5a on the outer circumference side, and—as can be seen in FIG. 11—are oriented radially outward. In this connection, an installation projection is provided in each corner of the hexagonal yoke sheet part 5a, in each instance. These installation projections have no magnetic relevance or function; they are intended to simplify the handling of the intermediate sheets during the course of production, and, in particular, during the course of package formation, particularly in order to prevent the yoke sheet parts 5a from being rotated relative to the pole-shoe sheet parts 5b. Even though these installation projections 17 are shown in the figures only for the six-pole exemplary embodiment, it is understood that such installation projections can also be provided for the other embodiments. In this connection, the installation projections 17 are formed onto the yoke sheet parts 5a in such a manner that they are disposed between two adjacent pole-shoe sheet sections 5b, and in the assembled state essentially align with a connection crosspiece 9 or a section 9 of the connection crosspiece. Furthermore, it can be seen in FIGS. 10 and 11 that the pole-shoe sections 12 and the pole-shoe sheet parts 5b have a width that approximately corresponds to the width of the magnets, or, if applicable, is slightly greater than the width of the magnets, whereby two holder crosspieces 18 are formed onto the pole-shoe sections 12 and onto the pole-shoe sheet parts 5b, in each instance, which crosspieces engage around the magnets. Although consequently, cavities are formed on both sides of the recesses in the case of this embodiment, as well, particularly secure hold of the magnets is guaranteed by means of the additional holder crosspieces 18. Such holder crosspieces can be provided in the other embodiments, as well.

Figure 12:
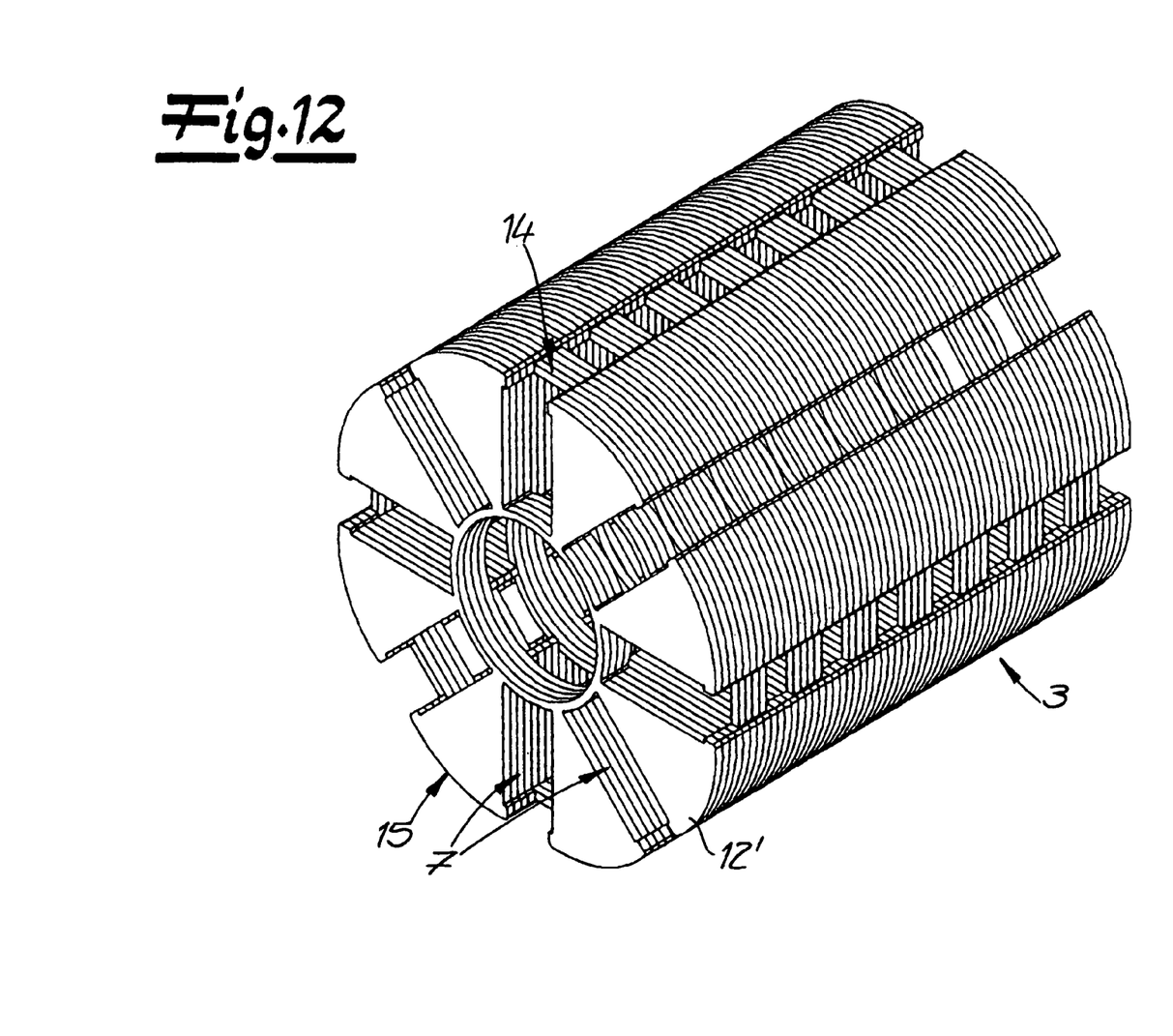
Figure 13:
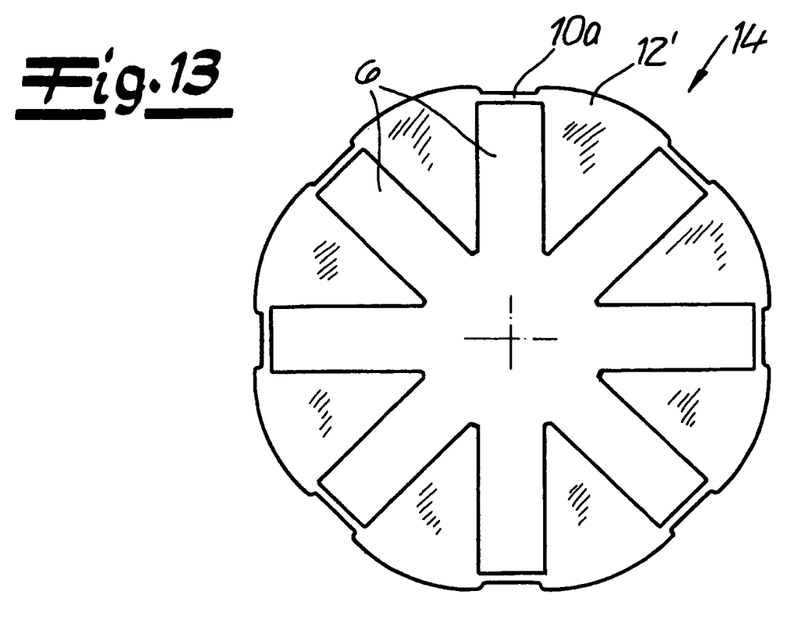
Figure 14:
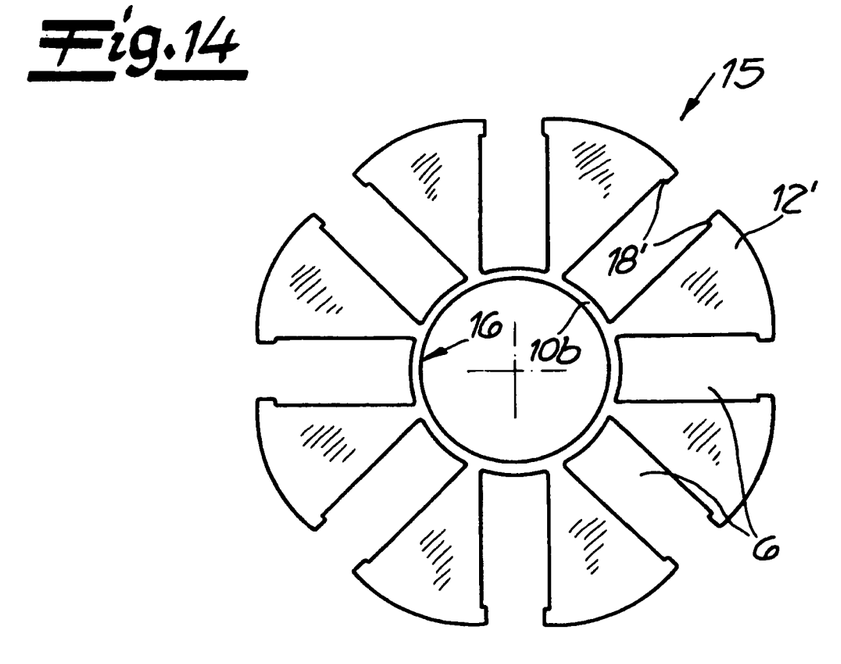

While FIGS. 1 to 11 show embodiments having magnets oriented essentially tangentially, a modified embodiment having magnets oriented essentially radially is shown in FIGS. 12 to 14. The exemplary embodiment involves an eight-pole variant, but this can also be implemented, in corresponding manner, with a different number of poles. In this embodiment, the rotor sheets 14, 15 have multiple pole-shoe sections 12' disposed between the magnets, whereby two adjacent pole-shoe sections 12', in each instance, are connected with one another by way of at least one connection crosspiece 10a, 10b. A comparison of FIGS. 12 to 14 makes it clear that here again, the sheet-metal package is composed of two rotor sheet types 14 and 15, respectively, which have different forms. On the one hand, the rotor has multiple rotor sheets 14 of a first sheet type, in which two adjacent pole-shoe sections 12' are connected by way of connection crosspieces 10a on the outer circumference side, which crosspieces delimit the recess 7 for the permanent magnets 8 on the outside. On the other hand, the rotor has multiple rotor sheets 15 of a second sheet type, in which two adjacent pole-shoe sections 12' are connected by way of connection crosspieces 10b on the inner circumference side, which delimit the recess 7 for the permanent magnets 8 on the inside. In this connection, the connection crosspieces 10a and 10b run in an essentially tangential direction. The sheet-metal package according to FIG. 12 is consequently composed of a plurality of sheets 14 of the first sheet type according to FIG. 13 and sheets 15 of the second sheet type according to FIG. 14. In this connection, the possibility exists of alternately combining a sheet of a first sheet type and a sheet of a second sheet type, in each instance. In the exemplary embodiment, four sheets of one sheet type are combined, in each instance, and then four sheets of the other sheet type in turn follow these four sheets of one sheet type. Although the recesses 6 are configured as open recesses, i.e. open on one side, in each instance, and are delimited by a connection crosspiece only on one side, a stable accommodation pocket 7 for the permanent magnets 8 is formed during the course of package formation. At the same time, the number of short-circuit crosspieces or saturation crosspieces is reduced. The arrangement is characterized by particularly great stability. In this connection, the connection crosspieces 10b of a rotor sheet, on the inside, form the ring 16 that surrounds the rotor shaft.

Furthermore, it can be seen in FIGS. 12 to 14 that even in this embodiment with radially oriented magnets, holder crosspieces 18' can be provided, which engage around the magnets in the assembled state. In this connection, it can be seen that such holder crosspieces 18' are formed onto the outer circumference side of the pole-shoe sheet sections 12' of the rotor sheets having connection crosspieces 10b on the inside.

It is understood that in the case of all the embodiments described, the individual sheets are combined in stable manner, to produce the sheet-metal package that is shown, in each instance. This can be done by way of punched package formation, for example by means of punch nubs and/or by means of gluing. Supplementally, it is often practical to encase the sheet-metal package in a suitable plastic, for example synthetic resin, by means of injection-molding. No details are shown in the figures.

The invention claimed is:

1. Permanent-magnetic rotor (2) for an electric motor, preferably for an internal rotor motor,
   which has a sheet-metal package (3) composed of multiple rotor sheets (4, 4', 5) stacked in the axial direction,
   whereby permanent magnets (8) are disposed in accommodation pockets (7) formed by recesses (6) of the rotor sheets,
   wherein the magnets (8) are oriented essentially tangentially, wherein the sheet-metal package (3) is composed of at least two rotor sheet types (4, 4', 5) that have different shapes, whereby on the one hand, multiple rotor sheets (4, 4') of a first rotor sheet type are provided as holder sheets (4, 4'), which have a central yoke sheet section (13), in each instance, which section is connected or can be connected with the rotor shaft, and have one or more outer pole-shoe sections (12), in each instance, which are connected with the yoke sheet section (13) by way of one or more connection crosspieces (9, 9', 10) or crosspiece sections (9, 10), whereby on the other hand, multiple rotor sheets (5) of a second rotor sheet type are provided as intermediate sheets (5), without any connection crosspieces, wherein the intermediate sheets (5) are configured in multiple parts and consist of multiple separate sheet sections (5a, 5b), wherein the multi-part intermediate sheets (5) have at least one central yoke sheet part (5a) that is connected or can be connected with a rotor shaft, and have one or more separate pole-shoe parts (5b) on the outer circumference side, and wherein the yoke sheet parts (5a) of the intermediate sheets (5) have one or more installation projections (17), which are formed onto the yoke sheet parts (5a) on the outer circumference side and are oriented radially toward the outside.

2. Rotor according to claim 1, wherein one or more intermediate sheets (5), preferably at least three intermediate sheets, are disposed between two axially spaced-apart holder sheets (4, 4').

3. Rotor according to claim 1, wherein two adjacent pole-shoe sections (12) of a holder sheet (4) are connected with one another by way of connection crosspieces or crosspiece sections (9, 10), which preferably run in a tangential direction, for example, on the outer circumference side.

4. Rotor according to claim 1, wherein the holder sheets (4) or the holder sheet parts (4a) have one or more recesses (6), in each instance, into which the magnets (8) are set, whereby the recesses are delimited, in certain regions, or at least in certain regions, by one or more connection crosspieces or crosspiece sections (9, 10).

5. Rotor according to claim 1, wherein the yoke sheet sections (13) of the holder sheets (4, 4a) align with the yoke sheet parts (5a) of the intermediate sheets (5) and/or wherein the pole-shoe sections (12) of the holder sheets (4, 4a) align with the pole-shoe sheet parts (5b) of the intermediate sheets (5).

6. Rotor according to claim 1, wherein the connection crosspieces (9, 10) are configured to be essentially T-shaped or L-shaped, with a radially oriented first crosspiece section (9) and a tangentially oriented second crosspiece section (10).

7. Rotor according to claim 1, wherein the connection crosspieces (9') are configured as simple, straight or essentially straight crosspieces, which directly connect a yoke sheet section (13) of the holder sheets/holder sheet parts (4, 4a) with a pole-shoe section (12), whereby adjacent crosspieces (9') assigned to two adjacent pole-shoe sections (12), for example, are disposed in V shape or in L shape, at a predetermined angle relative to one another.

8. Rotor according to claim 1, wherein the installation projections (17) are formed onto the yoke sheet parts (5a) in such a manner that they are disposed between two adjacent pole-shoe sheet sections (5b) and preferably align with a connection crosspiece or a section of a connection crosspiece in the assembled state.

9. Rotor according to claim 1, wherein the pole-shoe sections (12) and/or pole-shoe sheet parts (5b) have a width that approximately corresponds to the width of the magnets (8) or is less.

10. Rotor according to claim 1, wherein the pole-shoe sections (12) and/or pole-shoe sheet parts (5b) have a width that approximately corresponds to the width of the magnets (8) or is greater, whereby holder crosspieces (18) are preferably formed onto the pole-shoe sections (12) and/or the pole-shoe sheet parts (5b), which crosspieces engage around the magnets.

11. Rotor according to claim 1, wherein the recesses (6) are larger than the cross-sectional area of the magnets (8), so that when magnets are inserted into the recesses, cavities (11) are formed on both sides of the magnets (8).

12. Rotor according to claim 1, wherein the magnetization direction of the magnets (8) runs essentially in the radial or diametrical direction.

13. Rotor according to claim 1, wherein the rotor sheets (4, 4', 5, 14, 15) are combined into a sheet-metal package (3) via adhesion, material fit, shape fit and/or force fit, and wherein the sheet-metal package (3) is covered via injection-molding, for example with synthetic resin or plastic.

14. Permanent-magnetic rotor (2) for an electric motor, preferably for an internal rotor motor, which has a sheet-metal package (3) composed of multiple rotor sheets (4, 4', 5) stacked in the axial direction, wherein permanent magnets (8) are disposed in accommodation pockets (7) formed by recesses (6) of the rotor sheets, wherein the magnets (8) are oriented essentially tangentially, wherein the sheet-metal package (3) is composed of at least two rotor sheet types (4', 5) that have different shapes, wherein on the one hand, multiple rotor sheets (4') of a first rotor sheet type are provided as holder sheets (4'), which have a central yoke sheet section (13), in each instance, which section is connected or can be connected with the rotor shaft, and have one or more outer pole-shoe sections (12), in each instance, which are connected with the yoke sheet section (13) by way of one or more connection crosspieces (9, 10) or crosspiece sections (9, 10), wherein on the other hand, multiple rotor sheets (5) of a second rotor sheet type are provided as intermediate sheets (5), without any connection crosspieces, wherein the intermediate sheets (5) are configured in multiple parts and consist of multiple separate sheet sections (5a, 5b), wherein the multi-part intermediate sheets (5) have at least one central yoke sheet part (5a) that is connected or can be connected with a rotor shaft, and one or more separate pole-shoe parts (5b) on the outer circumference side, wherein the rotor sheets (4') of the first rotor sheet type, on the one hand, have at least a first sheet part (4a) as a holder sheet part, which has the central yoke sheet section (13) that is connected or can be connected with the rotor shaft, and has the one or more outer pole-shoe sections (12), which are connected with the yoke sheet section (13) by way of the one or more connection crosspieces (9, 9', 10) or crosspiece sections (9, 9', 10), and, on the other hand, has at least a second sheet part (4b) without any connection crosspieces, and wherein two rotor sheets (4') of the first sheet type, which are disposed one behind the other in the axial direction and axially at a distance from one another, are disposed offset by a predetermined angle (α) relative to one another.

15. Permanent-magnetic rotor (2) for an electric motor, preferably for an internal rotor motor,
    which has a sheet-metal package (3) composed of multiple rotor sheets (4') stacked in the axial direction,
    wherein permanent magnets (8) are disposed in accommodation pockets (7) formed by recesses (6) of the rotor sheets,
    wherein the magnets (8) are oriented essentially tangentially,
    wherein the sheet-metal package has at least rotor sheet types (4') of a first rotor sheet type, which are configured in multiple parts, in each instance,
    and on the one hand have at least one first sheet part as a holder sheet part, which has a (central) yoke sheet section (13) that is connected or can be connected with a rotor shaft, and has one or more outer pole-shoe sections (12) that are connected with the yoke sheet section (13) by way of one or more connection crosspieces (9, 9', 10) or crosspiece sections (9, 9', 10),
    and on the other hand have at least one second sheet part (4b) without any connection crosspieces, and
    wherein two rotor sheets (4') of the first sheet type, which are disposed one behind the other in the axial direction are disposed offset by a predetermined angle (α) relative to one another.

16. Permanent-magnetic rotor (2) for an electric motor, preferably for an internal rotor motor,
    which has a sheet-metal package (3) composed of multiple rotor sheets (4, 4', 5) stacked in the axial direction,
    wherein permanent magnets (8) are disposed in accommodation pockets (7) formed by recesses (6) of the rotor sheets,
    wherein the magnets (8) are oriented essentially tangentially or at a slant with reference to the radius of the rotor (2),
    wherein the rotor sheets (14, 15) have multiple pole-shoe sections disposed between the magnets, and wherein two adjacent pole-shoe sections (12'), in each instance, are connected with one another by way of at least one connection crosspiece (10a, 10b),
    wherein the sheet-metal package (3) is composed of at least two rotor sheet types (14, 15) having different shapes,
    wherein on the one hand, the sheet-metal package (3) has one or more rotor sheets (14) of a first sheet type, in which two adjacent pole-shoe sections (12') are connected by way of connection crosspieces (10a) on the outer circumference side, which crosspieces delimit the recess (7) for the permanent magnets (8) on the outside, and are oriented in an essentially tangential direction, and
    wherein on the other hand, the sheet-metal package (3) has one or more rotor sheets (15) of a second sheet type, in which two adjacent pole-shoe sections (12') are connected by way of connection crosspieces (10b) on the inner circumference side, which crosspieces delimit the recess (7) for the permanent magnets (8) on the inside and form a ring (16) that surrounds the rotor shaft.

\* \* \* \* \*